United States Patent

Phelps

[15] 3,707,277
[45] Dec. 26, 1972

[54] COMBINATION CROSS FLOW AND COUNTER FLOW COOLING TOWER

[72] Inventor: Peter M. Phelps, 15 Buckeye Way, Kentfield, Calif. 94904

[22] Filed: March 25, 1970

[21] Appl. No.: 22,506

[52] U.S. Cl.................261/23, 261/DIG. 11, 261/109
[51] Int. Cl. ................................................B01f 3/04
[58] Field of Search.................261/22, 23, 108–111, 261/DIG. 11

[56] References Cited

UNITED STATES PATENTS

| | | |
|---|---|---|
| 2,247,514 | 7/1941 | Mart..............................261/DIG. 11 |
| 2,662,756 | 12/1953 | McIlvaine............................261/23 |
| 3,115,534 | 12/1963 | Bottner...........................261/DIG. 11 |
| 3,411,758 | 11/1968 | Edmondson....................261/DIG. 11 |
| 3,318,586 | 5/1967 | Meredith........................261/DIG. 11 |

FOREIGN PATENTS OR APPLICATIONS 1,209,062 9/1959 France...........................261/DIG. 11

*Primary Examiner*—Bernard Nozick
*Attorney*—Flehr, Hohbach, Test, Albritton & Herbert

[57] ABSTRACT

A cooling tower including a counter flow packing section in the central portion of the tower, cross flow fill sections positioned laterally to and spaced-apart from the first named section, and an impermeable partition therebetween. A substantial portion of the packing and fill sections are disposed at the same elevation. In operation, water gravitating through the cross flow section is intersected by a transversely flowing air which is directed upwardly out of the tower. Simultaneously, an independent source of air is directed from below the counter flow section, wherein free counter flow with gravitating water occurs, and thence upwardly out of the tower.

6 Claims, 1 Drawing Figure

PATENTED DEC 26 1972
3,707,277
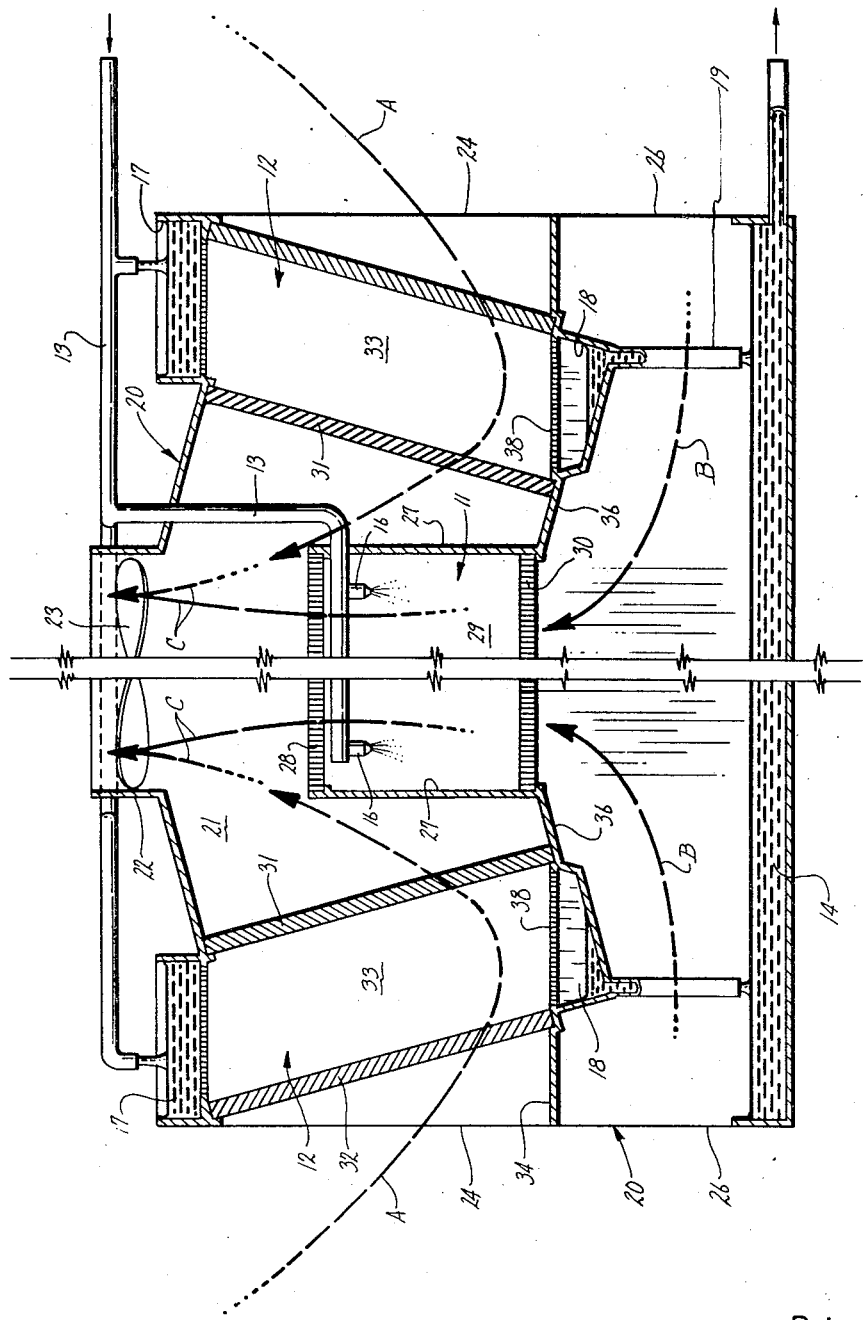
INVENTOR.
Peter M. Phelps
BY
Attorneys

COMBINATION CROSS FLOW AND COUNTER FLOW COOLING TOWER

BACKGROUND OF THE INVENTION

This invention relates generally to a cooling tower wherein liquid is cooled by contact with air on gravitating through a combination of cross flow and counter flow sections in the tower.

Conventional cooling towers are exclusively either of the cross flow or counter flow types. The former tower typically includes a central plenum chamber for redirecting air currents. This chamber is unused and thus wasted for cooling. Consequently, for a given heat load the tower's total volume must be substantially larger than the heat transfer section. This increased size is objectionable since such towers frequently are utilized in an area of limited space such as on the roof of a building to cool water used in heat exchange operations therein. A counter flow cooling tower is also inefficient in space utilization since air is normally prevented from entering the sides of the packing. Consequently, substantial open space must be left below the packing as an air inlet.

In an ineffectual attempt to overcome the aforementioned difficulties, cross flow fill was disposed adjacent to counter flow fill and air supplied to the side of the former fill flows therethrough into the latter fill wherein the air means is redirected and induced to flow upwardly and out the tower by means of a fan. This configuration is undesirable since the internal counter flow section receives spent air from each cross flow section. Furthermore, since the same stream of air flows in a redirected path through both fills, a substantial air drag is created which requires large amounts of suction from the induction fan. Another attempted combination cooling tower includes a counter flow section disposed above and discharging liquid onto a cross flow section therebelow. This design is inefficient as much unusable air plenum space is still necessary. Furthermore, a high tower is required for the superposed sections which necessitates a large pumping head and, also, is quite unseemly.

SUMMARY OF THE INVENTION AND OBJECTS

It is a general object of the invention to provide a combination cross flow and counter flow cooling water tower which overcomes the aforementioned disadvantages.

It is another object of the invention to provide a cooling tower of the above type having independent relatively thin heat exchange sections which provide a maximum of efficiency per unit volume.

It is a further object of the invention to provide a cooling tower which utilizes independent cross current and counter current streams of air while utilizing a central plenum space for heat exchange.

Additional objects and features of the invention will be apparent from the following description in which the preferred embodiment is set forth in detail in conjunction with the accompanying drawing.

In accordance with the above objects, an improved combination cross flow and counter flow cooling tower has been provided wherein gravitating water or other liquid is intersected by both cross flowing and counter flowing air in separate portions of the tower and the air upwardly exits via an outlet in the tower. A heat transfer section of the counter flow type (herein referred to as a packing section) is disposed centrally of the tower in communication with a lower air inlet in the tower and the tower air outlet. Cross flow fill sections (hereinafter fill sections) are disposed in the tower in lateral spaced-apart relationship to the packing means and communicate with an upper air inlet and the tower air outlet. Substantial portions of the packing and fill are disposed at the same elevation. An impermeable upstanding partition is disposed between the fill and packing sections and serves to prevent air flowing through the former from entering into the latter. In operation, air entering the lower inlet means proceeds upwardly through the packing section, intersects gravitating water therein, and exits through the tower air outlet. Simultaneously, air flows through the upper inlet across gravitating water in the fill section and proceeds through the tower air outlet. The air and liquid flow in the cross flow section is independent of the same flow in the counter flow section. Thus, an efficient and compact configuration for a cooling tower has been provided which combines the separate advantages of cross flow and counter flow units without significant diminishment in the efficiency of either as an independent entity.

BRIEF DESCRIPTION OF THE DRAWING

The drawing is a schematic representation in cross section of a cooling tower according to the invention.

DETAILED DESCRIPTION OF THE PREFERRED EMBODIMENT

Referring to the drawing, a cooling tower, includes a counter flow packing section 11, disposed centrally of the tower, a pair of conventionally inclined cross flow fill sections 12, at the sides thereof, piping 13 to supply water to sections 11 and 12, and a collection basin 14 disposed below the same to receive water gravitating through the sections. A series of distribution pipes containing a series of conventional nozzles 16 are positioned above section 11 to spray or distribute water evenly from piping 13 onto the upper portion of the section for gravitation therethrough and collection in basin 14. A pair of distribution trays 17 are positioned directly above fill sections 12 to receive water from piping 13 and to permit the same to gravitate through suitable apertures directly onto the upper portion of the fill. Intermediate collection pans 18 are disposed below fill sections 12 to receive water gravitating therethrough for distribution via outlet pipes 19 into basin 14. A housing 20 encases tower 10 and includes a central plenum exhaust chamber 21 about section 11 and between opposed inner faces of sections 12. A suitable pump structure, not shown, is operably coupled to basin 14 and piping 13 for removing cold water from the basin, delivering the water to equipment requiring the same for cooling, and for returning the thus-warmed water to nozzles 16 and trays 17.

A stack 22 is secured to the top face of housing 20 and extends upwardly from central chamber 21 to form an outlet for air exiting therefrom. Fan means 23 positioned within stack 22, adapted to be operably coupled to a suitable source of power for actuation, causes air to be drawn via a pair of upper air inlet openings 24 on opposite sides of housing 20 through section 12, generally along path A, and simultaneously via a pair of lower air inlet openings 26 also on opposite sides of the housing, through section 11, generally along path B. The air stream flowing along paths A and B merges in chamber 21 and is forced upwardly along paths C for discharge through stack 22. Alternatively, the cooling tower may operate by natural induction by elimination of fan means 23 in which case air would be induced to flow by means of the natural convention of the warm exhaust air stream rising through chamber 21.

Packing section 11 includes a pair of upstanding imperforate partition side walls 27 and a drift eliminator top wall 28. Conventional counter flow packing 29, disposed in chamber 11, includes substantially vertical air and water passages to permit free counter flow of gravitating water and air and to provide vertical plenar surfaces upon which the gravitating water can form a film of relatively large area to increase the heat transfer contact between the air and water. An optional bottom perforate wall 30 spanning walls 27, may be provided, if packing 29 requires lower support. Wall 28 may be of any conventional type, such as a series of inclined baffles to permit air to freely exhaust therethrough but to minimize the escape of water droplets.

Fill sections 12 includes a pair of inclined drift eliminator walls 31, similar to wall 28, opposed to air inlet louver walls 32 forming a transverse cross section in the shape of a parallelogram. The purpose of the parallelogram configuration is to compensate for the action of air currents which flow past the water gravitating through both sections 12 which causes the water to be forced inwardly toward chamber 21 at a slope similar to that of walls 31 and 32. Conventional cross flow fill 33 is disposed in section 12 in an overall configuration which forms substantially horizontal air passages which impede the upward flow while permitting water to gravitate and intersect the transversely flowing air. Typically, sections 12 include horizontal random slats upon which gravitating water splashes to form droplet heat transfer surfaces which are cooled on contact with the transversely flowing air.

Wall 31 and 32 are secured at their upper end in any suitable manner to the lower surface of trays 17. Walls 32 are secured at their lower end to a suitable portion of housing base 34. Base 34 also functions to separate the air flow into upper and lower openings 24 and 26. An impermeable support wall 36 spans the distance between corresponding walls 27 and 31 for mounting. Walls 36 prevent any air flowing generally along path B from being short circuited directly into chamber 21. Pans 18 may be secured at their opposite ends by suitable means, such as bolting, to walls 34 and 36. Optional bottom perforate walls 38, spanning the distance between walls 31 and 32 may be positioned below packing 33, if necessary for support of the same.

The general operation of the cooling tower includes two distinct and independent types of cooling functions performed in sections 11 and 12. In section 11, water is fed through piping 13 and nozzles 16 to form a spray which gravitates through section 11 and into basin 14. Air is induced to flow through opening 26 upwardly in a path countercurrent to that of the water, generally depicted as path B, and thence exhausts from chamber 21 by a stack 22, generally along path C, under the influence of forced induction by fan means 23 or by natural air currents. The water in section 11 is cooled either by heat transfer between warm water and cooled air or by the cooling effect of water evaporating under the influence of high velocity intersecting stream of generally unsaturated air or both. The packing in section 11 is of such a configuration as to assure a generally vertical flow of both air and water. The positioning of wall 36 prevents the bypass of air which should flow into section 11 through the space between walls 31 and 27. Furthermore, pans 18 serve as impermeable barriers to prevent air flowing along paths B from entering section 12.

In section 12, water is fed via piping 13 into pan 17 and gravitates through apertures therein as droplets through section 12 and from there the water is preliminarily collected in pans 18 for flow via pipe 19 into basin 14. Air is induced to flow through opening 24 in a generally transverse direction through sections 12, generally along typical path A, and then exhausts through chamber 21, generally along path C, as described above regarding the air flowing through section 11. The water is cooled in sections 12 under the same influence as described with respect to section 11 with the exception that typically the water forms heat transfer surfaces predominantly as droplets in the former case while it forms the same surfaces generally in the form of a film on the packing in the latter case. It should be emphasized that air flowing through sections 12 is prevented from entering section 11 by partition wall 27.

From the above mode of operation, it can be seen that water and air travels through sections 11 and 12 in independent paths. Consequently, each section is supplied with fresh, relatively cool and dry air which is undiluted by spent air exiting from a separate section. In other words, the spent air exiting from a first cooling section, which has relatively poor cooling characteristics, is not directed through a second cooling section.

Another advantage in requiring air to flow either through sections 11 or 12, but not both, is that air flow resistance is substantially less than that which would be created by series flow through the sections. Therefore, less power is required to drive fan means 23 to induce air to flow through the tower. To further reduce flow resistance to a minimum, the water exiting from sections 12 may be channeled into pipe 19 of relatively small diameter. If so, the flow of air to section 11 would have only a minor obstruction compared to that which would be formed by water gravitating across the entire bottom area of section 12. Alternatively, by eliminating pipe 19 the water would gravitate through an opening in a stream of relatively small cross section thereby also decreasing air resistance compared to an open-bottomed section 12.

It is noted that nozzles 16 are placed in a lower elevation than the outlets of piping 13 on both pans 17. According to this arrangement, there is no wasted pumping pressure head since the difference in pressure required to spray through the nozzle in comparison to that of free falling through the outlets above pan 17 is supplied by this difference in elevation.

An important advantage of the tower of my invention is that the overall height thereof necessary to supply a given amount of cooling capacity is considerably decreased in comparison, for example, to a combination wherein cross flow and counter flow heat exchange sections are superposed. According to my invention, substantial portions of my counter flow and cross flow heat exchange sections are disposed at the same elevation. Another economy of space, according to my invention, is that the central plenum chamber required for a cross flow cooling tower is utilized to perform a separate cooling operation. Thus, I have provided a compact cooling tower which is thereby desirable for ecomomy of construction and for aesthetic reasons, especially where such towers are placed in areas of limited space such as on top of large modern buildings.

Another advantage of my combined cross flow counter flow cooling tower is economy of operation and construction. For example, only a single piping supply of inlet water is necessary for both the cross flow and counter flow sections. In like manner, if forced induction is necessary, a single fan means suffices for the tower.

An additional advantage of my invention is that conventional existing cooling tower outer structures of either the cross flow or counter flow type, may be employed by replacing the interior components thereof. Upon such replacement, the same tower would have improved cooling efficiency.

Although cross flow sections positioned on both sides of the central counter flow section are a preferred configuration if such can be constructed, one only of the former sections could be employed in accordance with the invention. Such an arrangement occasionally would be used, as where air inlet is only available on one side of the tower.

Although the invention has been described by the use of water, other liquids may be cooled by a tower of the present invention.

It is apparent from the foregoing that an improved, compact combination cross flow and counter flow cooling tower has been provided which is economical both of construction and operation.

What is claimed is:

1. A cooling tower comprising sidewalls and an open top portion outlet, upper and lower air inlet openings disposed in at least one of said tower sidewalls, a cross flow housing having perforate outer and inner walls disposed in said tower with said outer wall proximate to and in open communication with said upper air inlet opening, cross flow fill disposed in said last named housing, a plenum chamber defined inwardly from said cross flow housing inner wall and below said open top portion, said plenum chamber serving to provide an area for the redirection of air from a generally horizontal path exiting from said cross flow housing to a generally vertical path exiting through said open top portion, a counter flow housing including counterflow packing with upper and lower perforate walls and disposed centrally of said tower in said plenum chamber in lateral spaced apart relation to said cross flow housing, said lower wall being in open communication with said lower air inlet opening and said upper wall being in open communication with said open top portion outlet of the tower, a liquid conduit, means for supplying liquid from said conduit to the upper surface of said cross flow fill from a position directly above the same, means for spraying a separate portion of liquid from said conduit upon the upper surface of said counter flow packing from a position directly above the same so that liquid from said conduit flows to said supply means and spray means in parallel paths, said liquid supply means being disposed sufficiently above said liquid spray means to provide enough pressure head to generate spray from the latter means, and impermeable partition means disposed between said cross flow housing and counter flow packing and serving to prevent cross flowing air from entering into said counter flow housing, whereby substantially independent air streams flow through each of the cross flow and counter flow housings.

2. A cooling tower as in claim 1 in which substantial portions of said counter flow and cross flow housings are disposed at the same elevation.

3. A cooling tower as in claim 1 in which said partition means forms an upstanding wall portion of said counter flow housing.

4. A cooling tower as in claim 1 in which said cross flow housing includes a substantially imperforate lower wall and an outlet conduit communicating therewith serving to channel liquid therefrom past said lower air inlet opening without substantial obstruction of air flowing therethrough.

5. A cooling tower as in claim 1 in which the upper surface of said counter flow housing is at an elevation substantially below the same surface of said cross flow housing.

6. A cooling tower as in claim 1 in which a second set of upper and lower air inlet openings are disposed, in another of said tower sidewalls, a second cross flow housing portion having perforate outer and inner walls is disposed in said tower proximate to and in open communication with said second upper air inlet opening and in outer lateral spaced apart relationship to said counter flow housing, second means is disposed in said tower for supplying liquid from said conduit to the upper surface of said cross flow fill from a position directly above the same, so that liquid from said conduit flows to said second supply means and spray means in parallel paths, said second liquid supply means being disposed sufficiently above said liquid spray means to provide enough pressure head to generate a spray from the latter means, and second impermeable partition means disposed between said second cross flow housing and counter flow packing and serving to prevent cross flowing air flowing from entering into said counter flow housing, whereby substantially independent air streams flow through each of the cross flow and counter flow housings.

* * * * *